US005808538A

United States Patent [19]

Nguyen

[11] Patent Number: 5,808,538

[45] Date of Patent: Sep. 15, 1998

[54] ELECTRICAL APPARATUS FOR OVERCURRENT PROTECTION OF ELECTRICAL CIRCUITS

[75] Inventor: Thinh Nguyen, Chicago, Ill.

[73] Assignee: Littelfuse, Inc., Des Plaines, Ill.

[21] Appl. No.: 667,955

[22] Filed: Jun. 19, 1996

[51] Int. Cl.$^{6}$ ........................ H02H 5/04

[52] U.S. Cl. ........................ 337/12; 337/14; 337/137; 337/140; 338/22 R; 361/58; 361/106

[58] Field of Search ........................ 337/140, 123, 337/139, 12, 14, 137; 361/58, 106; 338/22 R; 219/528, 541

[56] References Cited

U.S. PATENT DOCUMENTS

| | | | |
|---|---|---|---|
| 3,750,082 | 7/1973 | Petersen et al. | 338/220 |
| 4,327,282 | 4/1982 | Nauerth | 219/541 |
| 4,418,272 | 11/1983 | Roller et al. . | |
| 4,426,573 | 1/1984 | Fudickar et al. | 338/22 R X |
| 4,631,391 | 12/1986 | Tiepke | 219/541 |
| 4,698,614 | 10/1987 | Welch et al. | 338/22 R |
| 4,939,498 | 7/1990 | Yamada et al. | 338/22 R |
| 5,142,265 | 8/1992 | Motoyoshi et al. | 338/22 R |
| 5,153,555 | 10/1992 | Enomoto et al. | 338/22 R |
| 5,218,336 | 6/1993 | Murakami | 338/328 |
| 5,233,326 | 8/1993 | Motoyoshi | 338/22 R |
| 5,451,921 | 9/1995 | Crawford et al. | 338/220 |

FOREIGN PATENT DOCUMENTS

| | | |
|---|---|---|
| 0304196A2 | 2/1989 | European Pat. Off. . |
| 0 489 538 A1 | 6/1992 | European Pat. Off. . |
| 0 554 459 A1 | 8/1993 | European Pat. Off. . |
| 2064928A | 6/1981 | United Kingdom . |
| WO 94/06128 | 3/1994 | WIPO . |
| WO 95/10115 | 4/1995 | WIPO . |

*Primary Examiner*—Leo P. Picard
*Assistant Examiner*—Jayprakash N. Gandhi
*Attorney, Agent, or Firm*—Wallenstein & Wagner, Ltd.

[57] ABSTRACT

An electrical apparatus comprising first and second PTC elements composed of a polymer composition with conductive particles dispersed therein, an insulating body, and first and second conductive terminals. Flexible conductive members having a first end that can be electrically connected to a source of electrical power and a second end that is adapted to receive and make electrical contact with the apparatus are provided. The PTC element and the insulating body are positioned between the first and second conductive terminals so that when the apparatus is inserted between the flexible conductive members, the members exert a pressure on the insulating body.

29 Claims, 5 Drawing Sheets

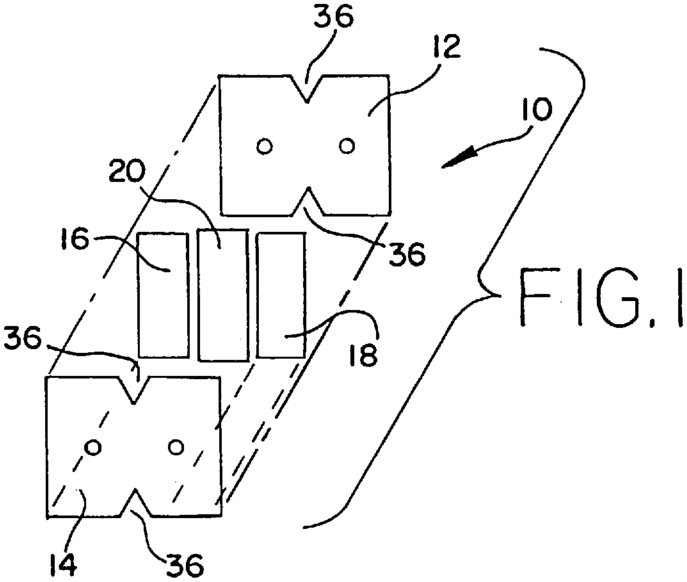
FIG. 1
FIG. 2
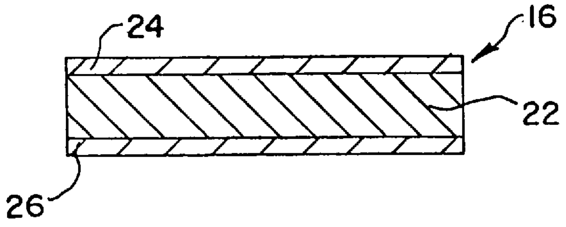
FIG. 3
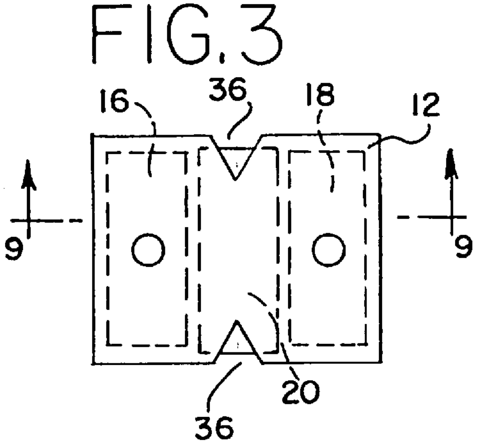
FIG. 4
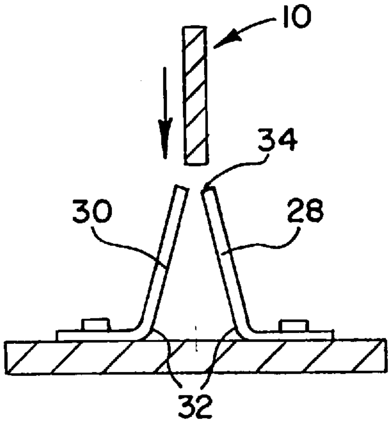

ELECTRICAL APPARATUS FOR OVERCURRENT PROTECTION OF ELECTRICAL CIRCUITS

TECHNICAL FIELD

The present invention relates generally to an electrical apparatus having a positive temperature coefficient (PTC) element for overcurrent protection of an electrical circuit.

BACKGROUND OF THE INVENTION

It is well known that the resistivity of many conductive materials change with temperature. Resistivity of a PTC conductive material increases as the temperature of the material increases. Many crystalline polymers, made electrically conductive by dispersing conductive fillers therein, exhibit this PTC effect. These polymers generally include polyolefins such as polyethylene, polypropylene and ethylene/propylene copolymers. At temperatures below a certain value, i.e., the critical or trip temperature, the polymer exhibits a relatively low, constant resistivity. However, as the temperature of the polymer increases beyond the critical point, the resistivity of the polymer sharply increases.

Polymer PTC materials have been used in electrical circuit protection devices to provide overcurrent protection to electrical components of a circuit. Under normal operating conditions in the electrical circuit, relatively little current flows through the PTC device. Thus, the temperature of the device (due to internal $I^2R$ heating) remains below the critical or trip temperature. If a resistive load in the circuit is shorted or if the circuit experiences a power surge, the current flowing through the PTC device increases and its temperature (due to internal $I^2R$ heating) rises rapidly to its critical temperature. As a result, the resistance of the PTC device greatly increases, effectively limiting the current flow in the circuit to a fraction of its original value. This negligible current value is enough to maintain the PTC device at a new, high temperature/high resistance equilibrium state, and will not damage the electrical components of the circuit.

The PTC device acts as a form of a fuse, reducing the current flow through the short circuit load to a safe, low value when the PTC device is heated to its critical temperature range. Upon interrupting the current in the circuit, or removing the condition responsible for the short circuit (or power surge), the PTC device will cool down below its critical temperature to its normal operating, low resistance state. The effect is a resettable, electrical circuit protection device.

Conventional polymer PTC electrical devices include a polymer PTC composition interposed between first and second electrodes. Conductive terminals are electrically connected to the first and second electrodes. The terminals can take a variety of geometric configurations (e.g., planar, columnar). In turn, the terminals can be electrically connected to additional electrical components, and ultimately to a source of electrical power.

The terminals of prior PTC devices have been designed to be soldered to conductive pads on a printed circuit board, physically strapped to the electrical component it is protecting, and to make electrical contact between two flexible conductive members.

In this last design, electrical contact is maintained by a pressure exerted on the PTC device by the flexible conductive members. This pressure, however, interferes with the electrical performance of the device. Consequently, prior PTC electrical devices of this type have been unreliable.

SUMMARY OF THE INVENTION

It is an object of the present invention to provide an electrical apparatus comprising a polymer PTC element which can be inserted between, and make electrical contact with, two flexible conductive members without altering the electrical performance of the polymer PTC element. The result is a reliable circuit protection device that can be easily and economically incorporated into numerous electrical systems.

It is another object of the present invention to provide an electrical apparatus where multiple PTC elements can be electrically connected in parallel to increase the current carrying capacity of the apparatus.

It is a further object of the present invention to provide a single electrical apparatus that includes a plurality of PTC devices, each device designed to provide overcurrent protection to a separate electrical circuit.

In accordance with a first aspect of the present invention, the electrical apparatus comprises: (a) first and second conductive terminals; (b) a first PTC element in electrical contact with the first and second conductive terminals; (c) a second PTC element in electrical contact with the first and second conductive terminals; and (d) an insulating body positioned adjacent to the first and second PTC elements.

In a second aspect of the present invention, the electrical apparatus comprises a plurality of PTC elements in electrical contact with first and second conductive terminals. The apparatus includes a plurality of insulating bodies electrically separating the PTC elements, each PTC element composed of a polymer composition having conductive particles dispersed therein and first and second electrodes adherent to opposing surfaces of the polymer composition. Since the PTC elements are electrically connected in parallel, one can increase the current carrying capacity of the apparatus by increasing the number of PTC elements.

In accordance with a third aspect of the present invention, the electrical assembly comprises: (a) a PTC device including a PTC element composed of a polymer composition having conductive particles dispersed therein, an insulating body, and first and second conductive terminals; (b) flexible conductive members having a first end that can be electrically connected to a source of electrical power and a second end that is adapted to receive and make electrical contact with the PTC device; and (c) the PTC element and the insulating body arranged between the first and second conductive terminals so that when the PTC device is inserted between the flexible conductive members, the members exert a pressure on the insulating body.

In another aspect of the present invention, an electrical assembly comprises: (a) a PTC device including first and second PTC elements composed of a polymer composition having conductive particles dispersed therein, an insulating body, and first and second conductive terminals; (b) flexible conductive members having a first end that can be connected to a source of electrical power and a second end that is adapted to receive and make electrical contact with the PTC device; and (c) the PTC elements and the insulating body positioned between the first and second conductive terminals so that the first PTC element is not in electrical contact with the second PTC element and when the PTC device is inserted between the conductive members, the members exert a pressure on the insulating body.

In yet another aspect of the present invention, an electrical apparatus comprises: (a) a plurality of PTC devices, each device comprising a PTC element and an insulating body adjacent to a portion of the PTC element, the PTC element composed of a polymer composition having conductive particles dispersed therein; (b) a common first conductive terminal; (c) a plurality of second conductive terminals; and (d) each PTC device in electrical contact with the first common conductive terminal and only one of the multiple second conductive terminals respectively. The second conductive terminals are electrically separated from each other so that the apparatus may provide overcurrent protection to multiple circuits.

In a final aspect, the present invention provides an electrical apparatus comprising: (a) a PTC element composed of a conductive polymer composition having conductive particles dispersed therein and two electrodes electrically connected to first and second faces of the PTC element, the polymer composition having a resistivity at approximately 25° C. of less than 5 ohm cm; (b) an insulating body positioned adjacent to the PTC element; and (c) first and second conductive terminals. The PTC element and the insulating body are interposed between the conductive terminals. The PTC element is also in electrical with the first and second conductive terminals.

Other advantages and aspects of the present invention will become apparent upon reading the following description of the drawings and detailed description of the present invention.

BRIEF DESCRIPTION OF THE DRAWINGS

In order that the present invention may be understood, it will now be described by way of example, with reference to the accompanying drawings in which:

FIG. 1 is an exploded perspective view of one embodiment of an electrical apparatus according to the present invention;

FIG. 2 is a front view of a preferred embodiment of a PTC element according to the present invention;

FIG. 3 is a plan view of the electrical apparatus illustrated in FIG. 1;

FIG. 4 is a side view of one embodiment of an electrical assembly according to the present invention;

DETAILED DESCRIPTION OF THE PREFERRED EMBODIMENT

Figure 5:
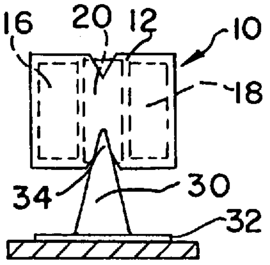
FIG. 5 is a front view of the electrical assembly illustrated in FIG. 4 with the PTC device inserted between the flexible conductive members.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

The electrical apparatus of a first embodiment of the present invention, generally designated by reference numeral 10, is shown in FIG. 1. The electrical apparatus comprises first 12 and second 14 conductive terminals, first 16 and second 18 PTC elements, and an insulating body 20. The first 16 and second 18 PTC elements are in electrical contact with the first 12 and second 14 conductive terminals. The insulating body 20 is positioned adjacent to, and electrically separates, the first 16 and second 18 PTC elements. Consequently, the PTC elements 16, 18 are electrically connected in parallel.

A preferred embodiment of PTC elements 16, 18 is illustrated in FIG. 2. The PTC element 16 comprises a PTC composition 22 electrically connected to a first 24 and second 26 electrode. A variety of PTC materials are suitable for use in the present invention. For example doped ceramics such as barium titanate or strontium titanate can be used. Preferably, however, the PTC composition 22 comprises a crystalline polymer having conductive particles dispersed therein. Generally the polymer will comprise a polyolefin selected from the group consisting of polyethylene, polypropylene, copolymers of polyethylene and ethylene/propylene copolymers. Preferably, the conductive particles comprise carbon black.

Suitable PTC compositions and PTC elements will generally have a resistivity at approximately 25° C. of less than 5 ohm cm, preferably less than 2 ohm cm, especially less than 1 ohm cm. Examples of such PTC compositions and PTC elements are disclosed in U.S. patent application Ser. No. 08/437,966 (filed May 10, 1995) and Ser. No. 08/614,038 (filed Mar. 12, 1996) and U.S. Pat. Nos. 4,237,441, 4,689,475 and 4,800,253. These applications and patents are specifically incorporated herein by reference.

Insulating body 20 can be formed from any dielectric material such as ceramic. In a preferred embodiment, insulating body 20 is formed from a material marketed under the tradename Fyrex Paper and manufactured by Grant Wilson, Inc., Chicago, Ill.

In a preferred embodiment illustrated in FIG. 3, the PTC elements 16, 18 and the insulating body 20 are interposed between the first and second conductive terminals 12, 14. The PTC elements 16, 18 are electrically and physically separated by the insulating body 20. The PTC elements 16, 18 are soldered to the terminals 12, 14 to produce a composite electrical apparatus.

With reference now to FIGS. 4 and 5, the electrical apparatus 10 is ideally suited for making electrical contact between flexible conductive members 28, 30. The flexible conductive members 28, 30 have a first end 32 that can be connected to a source of electrical power and a second end 34 that is adapted to receive and maintain electrical contact with the electrical apparatus 10.

To maintain sufficient electrical contact, the flexible conductive members 28, 30 must apply an equal and opposite force on the apparatus 10. In order to prevent these forces from interfering with the PTC behavior of the PTC elements 16, 18, the apparatus 10 is inserted between the flexible conductive members 28, 30 so that electrical contact is made with portions of the first and second conductive terminals 12, 14 adjacent to the insulating body 20. As a result, the forces from the flexible conductive members 28, 30 are applied to the insulating body 20 not the PTC elements 16, 18. Thus, the PTC composition 22 is free to expand in response to fault conditions (i.e., increased $I^2R$ heating or an increase in ambient temperature) and switch to its high temperature/high resistance state.

The parallel configuration of the PTC elements 16, 18 permits the electrical apparatus 10 to provide protection to circuits with greater electrical currents than a single PTC device placed in series with a resistive load and power source. The rating (i.e., the current carrying capability) of the apparatus 10 can be increased in several ways. First, by increasing the resistance, R, of the PTC elements 16, 18 one can increase the rating of the apparatus. For, example an apparatus 10 having PTC elements 16, 18 with resistances, $R_1$ and $R_2$, that are greater than 10 ohm will have a higher rating than an apparatus having PTC elements 16, 18 with resistances of less than 10 ohm, less than 5 ohm and certainly less than 1 ohm.

In a preferred embodiment, the resistance of the first PTC element $R_1$ will be approximately equal to the resistance of the second PTC element $R_2$. However, the present invention also contemplates applications where $R_1$ is greater than $R_2$ (e.g., $R_1$ is approximately equal to $1.5\times R_2$).

Figure 6:
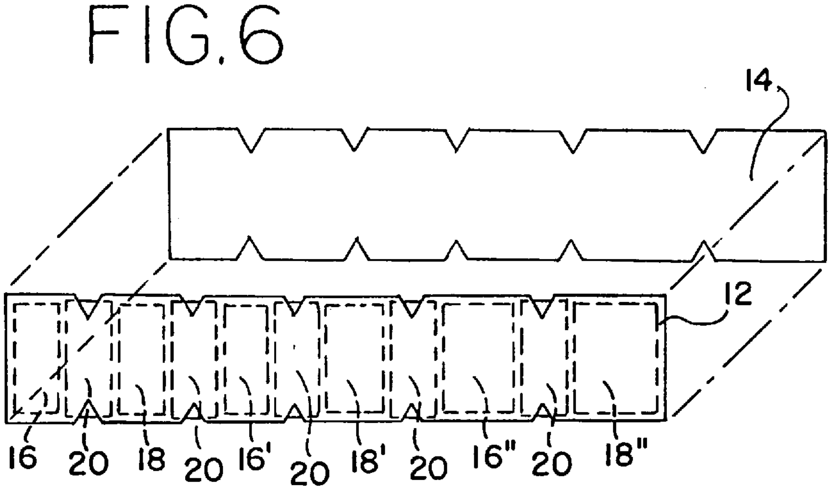
FIG. 6 is a perspective view of another embodiment of the electrical apparatus according to the present invention.

By adding additional PTC elements to the apparatus, the rating of the apparatus may also be increased. Referring now to FIG. 6, according to another embodiment of the invention, the apparatus 10 comprises a plurality of PTC elements 16, 18, 16', 18', 16", 18" in electrical contact with the first 12 and second 14 conductive terminals. A plurality of insulating bodies 20 electrically separate the PTC elements so that the PTC elements are connected electrically in parallel to one another.

Figure 5A:
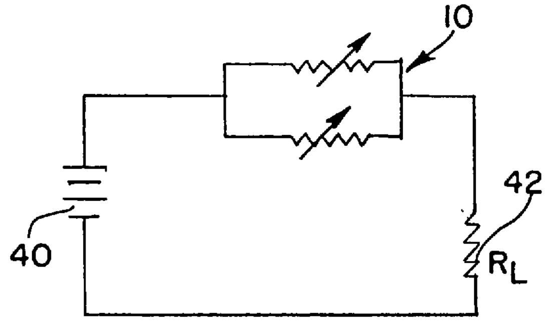
FIG. 5A is a schematic diagram of an electrical circuit comprising the electrical apparatus illustrated in FIGS. 1, 3 and 5.
Figure 6A:
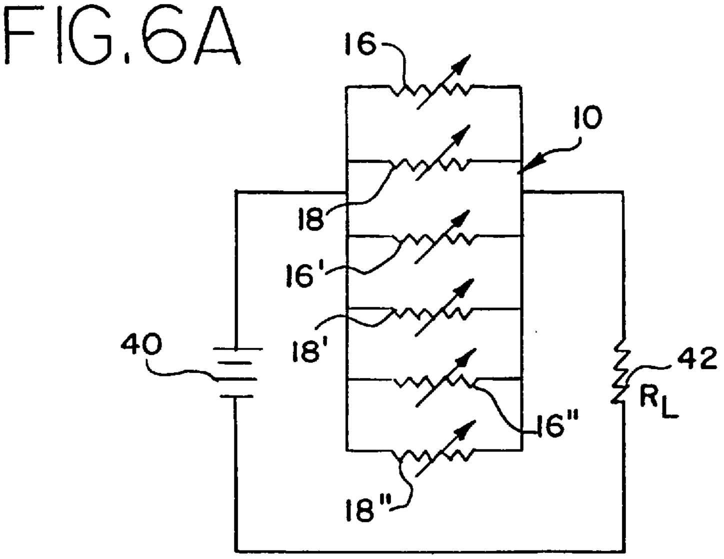
FIG. 6A is a schematic diagram of an electrical circuit comprising the electrical apparatus illustrated in FIG. 6.

FIGS. 5A and 6A schematically illustrate the use of the apparatus 10 illustrated in FIGS. 5 and 6 respectively in an electrical circuit comprising a power source 40 and a resistive load 42.

In a preferred embodiment best illustrated in FIGS. 1, 3 and 5, the periphery of the first conductive terminal 12 and the second conductive terminal 14 have corresponding portions 36 removed. These removed portions 36 help facilitate insertion of the terminals 12, 14 between the flexible conductive members 28, 30. By aligning the insulating body 20 adjacent the removed portions 36, one can assure that when the terminals 12, 14 are inserted between the flexible conductive members 28, 30, the force or pressure exerted by the members will be mainly distributed to the insulating body 20, not the PTC elements 16, 18.

Figure 9:
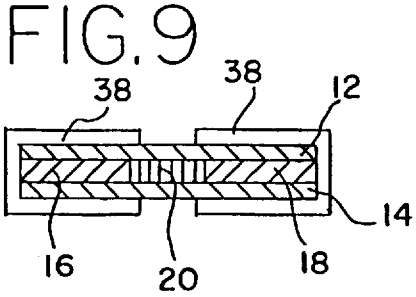
FIG. 9 is a cross-sectional view taken of the apparatus illustrated in FIG. 3 with non-conductive layers applied to the outer surfaces of the terminals.

In yet a more preferred embodiment illustrated in FIG. 9, a non-conductive layer 38 can be applied to the outer surfaces of at least the first conductive terminal 12 adjacent the first 16 and second 18 PTC elements. This design allows electrical contact between the flexible conductive members 28, 30, and the apparatus 10 to take place only adjacent to the insulating body 20. In this manner, the non-conductive layer 38 functions as a guide so that the apparatus 10 cannot be mistakenly inserted between the members 28, 30 such that the pressure or force exerted by the members 28, 30 will interfere with the electrical performance of the PTC elements 16, 18. Preferably, the non-conductive layer 38 is composed of a silicon or epoxy resin.

Figure 7:
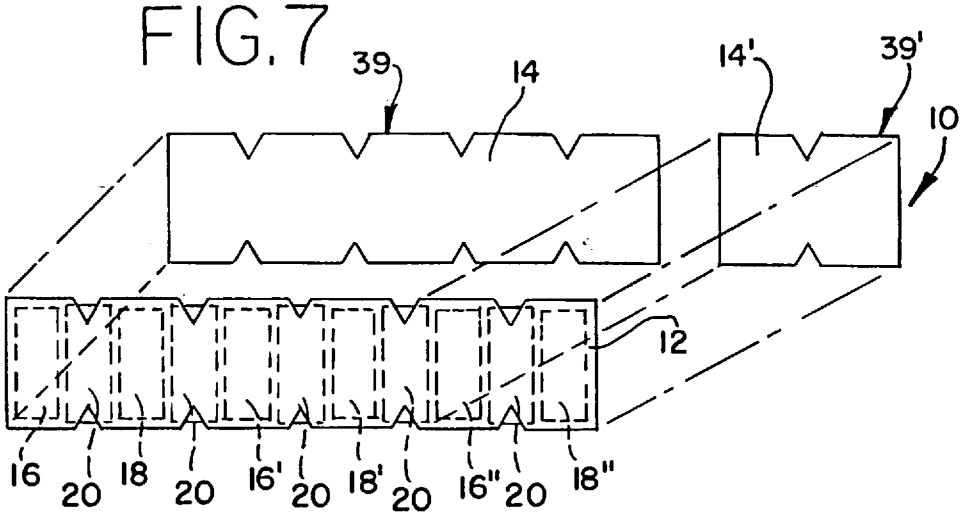
FIG. 7 is a perspective view of a third embodiment of the electrical apparatus according to the present invention.
Figure 8:
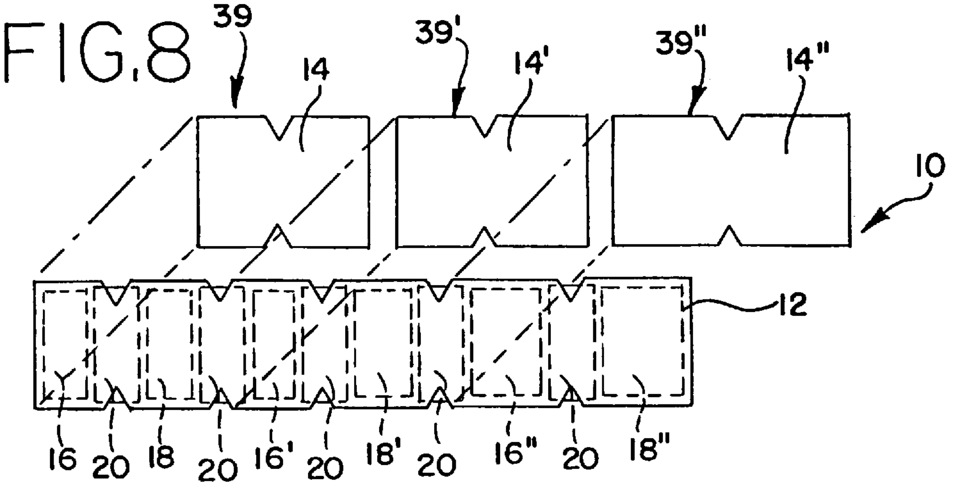
FIG. 8 is a perspective view of a fourth embodiment of the electrical apparatus according to the present invention.

A single electrical apparatus 10 can also provide overcurrent protection to multiple electrical circuits by providing multiple second conductive terminals 14. Referring now to FIGS. 7 and 8, the apparatus 10 comprises a plurality of PTC devices 39, 39', 39", etc. In turn, each device is comprised of PTC elements 16, 18, 16', 18', 16", 18" etc. separated by an insulating body 20, a common first conductive terminal 12, and a second conductive terminal 14, 14', 14" etc. Each PTC element is in electrical contact with the common first conductive terminal 12 but only one of the plurality of second conductive terminals 14, 14', 14", etc. The insulating bodies 20 are positioned adjacent to the PTC elements such that the PTC elements are not in electrical contact with one another. The apparatus 10 in FIG. 7 includes two PTC devices 39, 39' while the apparatus 10 in FIG. 8 includes three PTC devices 39, 39', 39".

It should be understood by those having skill in the art that a single apparatus of the present invention can be used to protect multiple electrical circuits by adding the appropriate number of PTC devices to the apparatus. It should also be understood by those having skill in the art that the rating of the PTC devices can be varied by adding PTC elements or varying the resistivity of the PTC composition. Thus, a single apparatus can protect a number of circuits having different ratings.

Figure 7A:
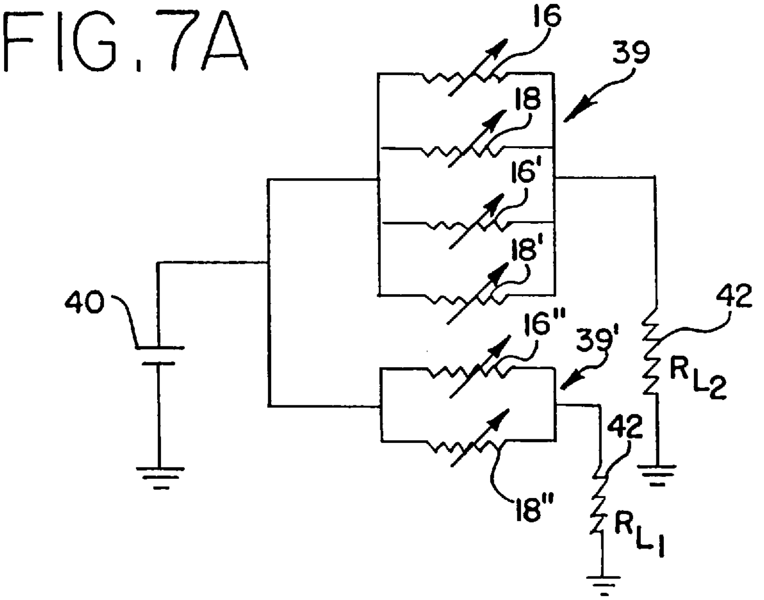
FIG. 7A is a schematic diagram of an electrical circuit comprising the electrical apparatus illustrated in FIG. 7.
Figure 8A:
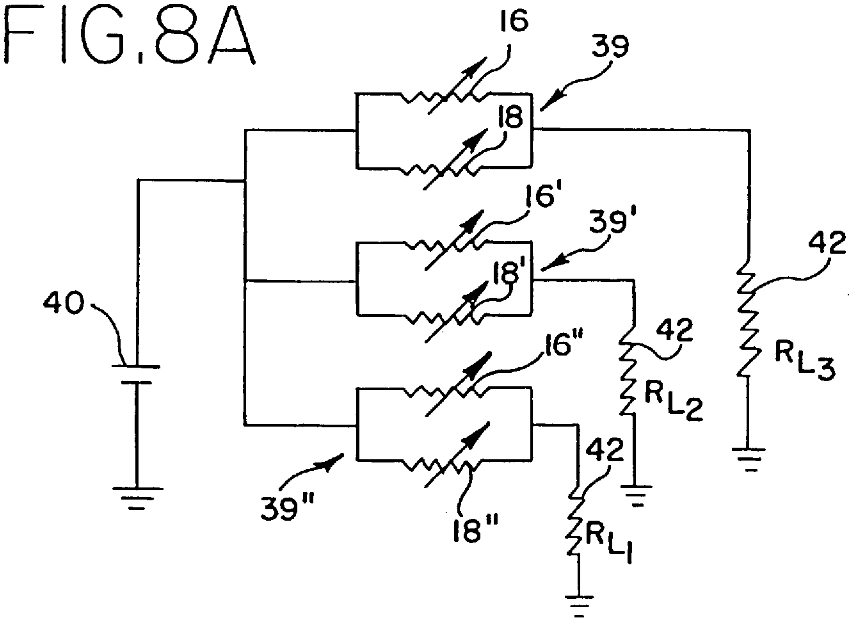
FIG. 8A is a schematic diagram of an electrical circuit comprising the electrical apparatus illustrated in FIG. 8.

FIGS. 7A and 8A schematically illustrate the use of the apparatus 10 illustrated in FIGS. 7 and 8 respectively in an electrical circuit comprising a power source 40 and a resistive load 42. The apparatus 10 illustrated in FIGS. 7 and 7A provides overcurrent protection to two circuits having resistive loads $R_{L1}$ and $R_{L2}$. The apparatus 10 illustrated in FIGS. 8 and 8A provides overcurrent protection to three circuits having resistive loads $R_{L1}$, $R_{L2}$ and $R_{L3}$ respectively.

Figure 10:
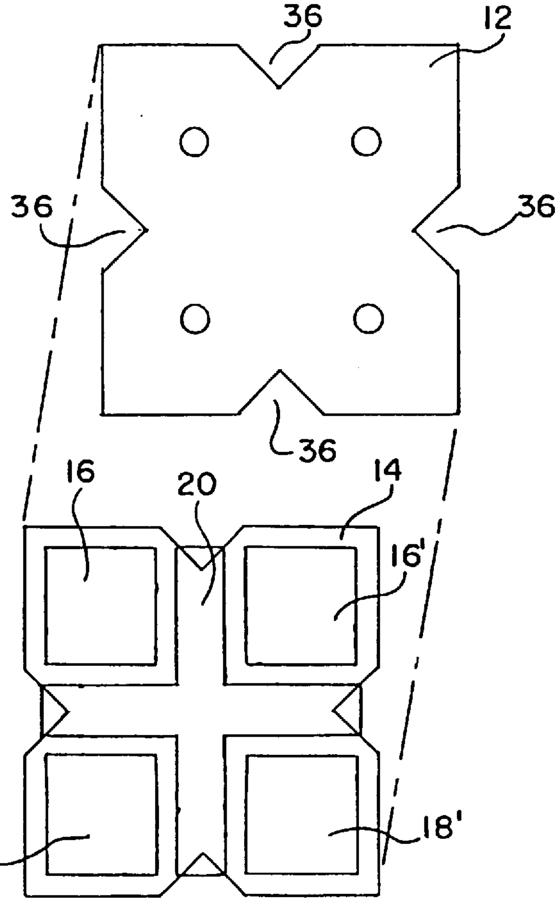
FIG. 10 is an exploded perspective view of another embodiment of an electrical apparatus according to the present invention.

FIG. 10 illustrates the apparatus 10 according to another embodiment of the present invention. The apparatus 10 includes PTC elements 16, 18, 16', 18', a single insulating body 20 and first 12 and second 14 conductive terminals. The insulating body 20 is cross-shaped and electrically separates the PTC elements from one another. The conductive terminals 12, 14 have corresponding portions 36 removed from all four sides of their respective peripheries. The conductive terminals 12, 14 are soldered to the PTC elements 16, 18, 16', 18' such that the removed portions 36 of the conductive terminals 12, 14 are adjacent to portions of the insulating body 20. In this embodiment, the apparatus 10 is symmetrical and electrical contact can be made from the top, bottom or either side of the apparatus 10.

Figure 10A:
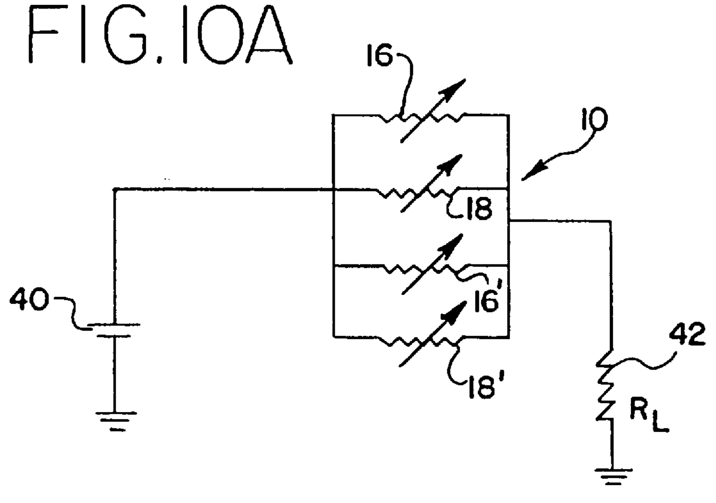
FIG. 10A is a schematic diagram of an electrical circuit comprising the electrical apparatus illustrated in FIG. 10.

FIG. 10A schematically illustrates the use of the apparatus 10 illustrated in FIG. 10 in an electrical circuit comprising a power source 40 and a resistive load 42. The apparatus 10 provides overcurrent protection to a single circuit having a resistive load $R_L$.

Figure 11:
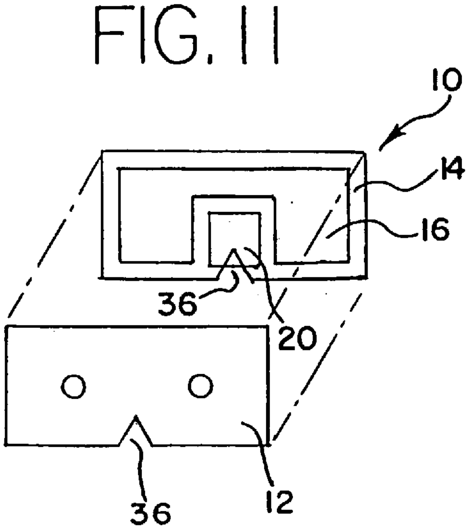
FIG. 11 is an exploded perspective view of another embodiment of an electrical apparatus according to the present invention.
Figure 12:
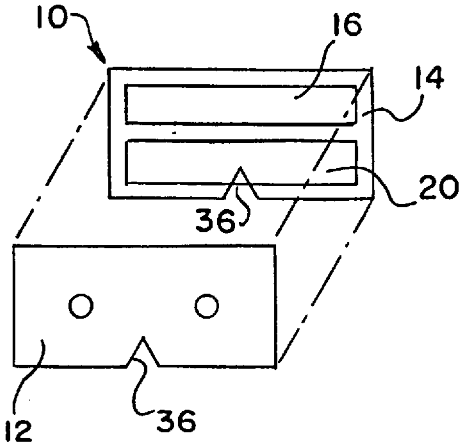
FIG. 12 is an exploded perspective view of a final embodiment of an electrical apparatus according to the present invention.

The present invention also contemplates an electrical apparatus with a single PTC element. With reference to FIGS. 11 and 12, the apparatus 10 comprises a single PTC element 16, insulating body 20, and first 12 and second 14 conductive terminals. The PTC element 16 is in electrical contact with the conductive terminals 12, 14. To facilitate insertion of the apparatus 10 between flexible conductive members (not shown in FIGS. 11 and 12), the conductive terminals 12, 14 have corresponding portions 36 of their peripheries removed. The PTC element 16 and the insulating body 20 are positioned between the conductive terminals 12, 14 so that body 20 is adjacent the removed portions 36 of the terminals 12, 14.

It will be understood that the invention may be embodied in other specific forms without departing from the spirit or central characteristics thereof. The present embodiment, therefore, is to be considered in all respects as illustrative and not restrictive, and the invention is not to be limited to the details given herein.

What I claim is:

1. An electrical apparatus for making an electrical connection between a pair of flexible conductive members the apparatus comprising:

(a) first and second conductive terminals;

(b) a first PTC element in electrical contact with the first and second conductive terminals;

(c) a second PTC element in electrical contact with the first and second conductive terminals; and (d) an insulating body positioned adjacent to the first and second PTC elements such that when the apparatus is electrically connected between the flexible conductive members, the members exert a force upon the insulating body.

2. The electrical apparatus of claim 1 wherein the first and second PTC elements comprise a polymer composition having conductive particles dispersed therein.

3. The electrical apparatus of claim 2 wherein the composition comprises a polymer selected from the group consisting of polyethylene, polypropylene, copolymers of polyethylene and ethylene/propylene copolymers.

4. The electrical apparatus of claim 2 wherein the conductive particles comprise carbon black.

5. The electrical apparatus of claim 2 wherein the first and second PTC elements are electrically connected in parallel.

6. The electrical apparatus of claim 2 wherein the each PTC element further comprises first and second electrodes.

7. The electrical apparatus of claim 2 wherein the first and second PTC elements have a resist of the first approximately 25° C., $R_1$ and $R_2$, the resistance of the first PTC element, $R_1$, approximately equal to the resistance of the second PTC element, $R_2$.

8. The electrical apparatus of claim 2 wherein the first and second PTC elements have a first and second resistance at approximately 25° C., $R_1$ and $R_2$, the resistance of the first PTC element, $R_1$, is at least 1.5 times greater than the resistance of the second PTC element, $R_2$.

9. The electrical apparatus of claim 2 wherein the polymer composition having conductive particles dispersed therein of each first and second PTC element is interposed between and in electrical contact with first and second electrodes respectively, the first conductive terminal being electrically connected to the first electrode of both the first and second PTC elements respectively, and the second conductive terminal being electrically connected to the second electrode of both the first and second PTC elements respectively.

10. The electrical apparatus of claim 8 wherein $R_1$ and $R_2$ are greater than 10 ohm.

11. The electrical apparatus of claim 8 wherein $R_1$ and $R_2$ are less than 10 ohm.

12. The electrical apparatus of claim 8 wherein $R_1$ and $R_2$ are less than 5 ohm.

13. The electrical apparatus of claim 8 wherein $R_1$ and $R_2$ are less than 1 ohm.

14. The electrical apparatus of claim 2 further comprising additional PTC elements in electrical contact with the first and second conductive terminals and electrically connected in parallel to the first and second PTC elements.

15. The electrical apparatus of claim 2 wherein the first conductive terminal has a first periphery and the second conductive terminal has a second periphery, the peripheries of the first and second conductive terminals having portions removed to facilitate insertion of the terminals between flexible conductive members.

16. The electrical apparatus of claim 15 wherein the insulating body and the first and second PTC elements are positioned between the first and second conductive terminals such that when the terminals are inserted between the flexible conductive members a pressure is distributed to the insulating body.

17. The electrical apparatus of claim 2 wherein the first and second PTC elements and the insulating body are interposed between inner surfaces of the first and second conductive terminals, a non-conductive layer contacting the outer surfaces of the first conductive terminal adjacent the first and second PTC elements.

18. An electrical apparatus for making an electrical connection between a pair of flexible conductive members, the apparatus comprising a plurality of PTC elements in electrical contact with first and second conductive terminals and a plurality of insulating bodies electrically separating the PTC elements such that when the apparatus is electrically connected between the flexible conductive members, the members exert a force upon at least one of the plurality of insulating bodies, each PTC element composed of a polymer composition having conductive particles dispersed therein and first and second electrodes adherent to opposing surfaces of the polymer composition.

19. An electrical assembly comprising:

(a) a PTC device comprising:

(1) a PTC element composed of a polymer composition having conductive particles dispersed therein;

(2) an insulating body;

(3) first and second conductive terminals;

(b) flexible conductive members having a first end that can be electrically connected to a source of electrical power and a second end that is adapted to receive and make electrical contact with the PTC device; and (c) the PTC element and the insulating body positioned between the first and second conductive terminals so that when the PTC device is inserted between the flexible conductive members, the members exert a pressure on the insulating body.

20. An electrical assembly comprising:

(a) a PTC device comprising:

(1) first and second PTC elements composed of a polymer composition having conductive particles dispersed therein;

(2) an insulating body;

(3) first and second conductive terminals;

(b) flexible conductive members having a first end that can be connected to a source of electrical power and a second end that is adapted to receive and make electrical contact with the PTC device; and (c) the PTC elements and the insulating body positioned between the first and second conductive terminals so that the first PTC element is not in electrical contact with the second PTC element and when the PTC device is inserted between the flexible conductive members, the members exert a pressure on the insulating body.

21. The electrical assembly of claim 20 wherein the first and second PTC elements are electrically and physically connected to the first and second conductive terminals.

22. The electrical assembly of claim 20 wherein the first and second PTC elements are soldered to the first and second conductive terminals.

23. The electrical assembly of claim 20 wherein the PTC device further comprises additional PTC elements which increase a current carrying capacity of the device.

24. The electrical assembly of claim 20 wherein the first conductive terminal has a first periphery and the second conductive terminal has a second periphery, the peripheries of the first and second conductive terminals having portions removed to facilitate insertion of the PTC device between the flexible conductive members.

25. The electrical assembly of claim 24 wherein the insulating body extends beyond the peripheries of the first and second conductive terminals into the portion of the terminals which have been removed to facilitate insertion of the PTC device between the flexible conductive members.

26. The electrical assembly of claim 20 further comprising a non-conductive layer contacting an outer surface of the first conductive terminal adjacent the first and second PTC elements such that a conductive portion of the outer surface of the first terminal is adjacent the insulating body.

27. The electrical assembly of claim 26 wherein the second end of the flexible conductive members make electrical contact with the conductive portion of the outer surface of the first terminal when the PTC device is inserted between the flexible conductive members.

28. An electrical apparatus comprising:

(a) a plurality of PTC devices, each device comprising a PTC element and an insulating body adjacent to a portion of the PTC element, the PTC element composed of a polymer composition having conductive particles dispersed therein;

(b) a common first conductive terminal;

(c) a plurality of second conductive terminals electrically separated from each other; and (d) each PTC device in electrical contact with the first common conductive terminal and only one of the multiple second conductive terminals.

29. An electrical apparatus comprising:

(a) a PTC element composed of a conductive polymer composition having conductive particles dispersed therein and two electrodes electrically connected to first and second faces of the PTC element, the polymer composition having a resistivity at approximately 25° C. of less than 5 ohm cm;

(b) an insulating body positioned adjacent to the PTC element;

(c) first and second conductive terminals, the PTC element and the insulating body positioned between the conductive terminals.

* * * * *